Patented Feb. 1, 1927.

1,615,822

UNITED STATES PATENT OFFICE.

ROLAND P. BAILE, OF MEDFORD, MARYLAND.

NEW FOOD AND PROCESS OF PRODUCTION.

No Drawing.    Application filed December 20, 1923. Serial No. 681,825.

This invention relates to a food product and more particularly to the utilization of neutrally flavored or otherwise suitable edible beans (particularly soya beans) although "navy beans" have also been used in the form of a paste which is readily adapted as a filling for sandwiches and the like.

The invention aims to effect an improvement in the method of forming a "butter" of beans, such as the soya bean, for instance, and particularly to the production of one in which, in a novel way, an improved flavor is developed akin to or including that of some nut or other proper food of desirable flavor for the purpose.

It is an important object to lessen the expense involved in manufacture of the product, without impairment of flavor or nutritional value as compared to the products of other methods.

It is a further important object to produce a flavor resembling that of certain nuts, with small liability of materially deviating from a fixed standard of proportions in the preparation of the butter.

With these and other objects in mind, which will become apparent from the following description, my process consists substantially as follows, when using the soya bean:

A quantity of beans (the quantity depending upon the facilities for handling which are available) are thoroughly washed and soaked in water, or steamed, in order to get the beans thoroughly soaked or saturated with water, and at the same time to loosen the outer skin. It is very important to have the beans thoroughly soaked, as quick extraction of this water from the beans through the action of the boiling oil treatment (which turns the water rapidly to steam), has an important effect; for one thing, it gives the desired brittleness and improves the powdering quality of the beans subsequently. The bean is greatly enlarged by the saturation, and retains its larger size in the oil treatment, where the enlargement becomes permanent. Consequently the bean is of a more open or larger cell structure after the oil treatment as described, which makes it structurally weaker, and is of advantage in the grinding and otherwise. The time required for soaking of the beans depends largely upon the age of the beans, for in some instances only a short time is required, while at other times a much longer time may be required. In practice, good results have been obtained by soaking the beans for about twelve hours. In addition to the advantages or the saturation of the beans, as above stated, the skins are also thereby loosened.

After the beans have passed the soaking period they are removed from the water and run through a machine which removes the wet skins. I find that any of the machines having rubber rollers do the work satisfactorily. Or, the beans may be dried by hot air, just enough to cause the skins to shrink, then the beans are put through any one of the various hulling machines used for this class of work and the skins removed in this manner. The hulls having been removed the bean kernals are now introduced into some suitable nut oil while the oil is boiling, and are boiled therein until the beans have acquired a good brown color and a suitable brittleness. The beans having attained this characteristic and quality are now removed from the boiling oil, and, while hot, are passed through a pulverizing machine, which reduces the beans to a fine powder, to which is added the desired nut oil to give it the proper viscosity. The beans may be ground after cooling, if desired, though it is preferable to grind them in the hot state.

The butter-like substance may be now salted to bring out the flavor properly, and if desired, a further amount of nut oil may be introduced thereinto to improve the texture or further flavor the butter. If desired, oil may be added during the grinding of the beans. This may be an oil of neutral taste, as, cotton-seed oil, as the boiling seeems to give a nut taste of ample strength. This reduces the cost of the product.

Preferably I employ peanut oil as the boiling medium, but various edible nut oils are available, and I do not wish to limit myself to the use of a single oil, for, by the use of various oils, I am enabled to produce nut-like butter of distinctive tastes, namely, tastes similar to the flavor of nuts from which the oils are procured. By the boiling of such beans in the manner described, a distinct nut-like taste is developed in the beans themselves. It will be apparent, of course, that the beans boiled in the manner described will be thoroughly impregnated with the oil in which they are boiled.

The browning of the beans in boiling oil—especially a nut-oil—causes them to develop a meaty flavor distinctive and pleasant so that ordinarily no additional flavoring is required. It is not understood what causes this peculiarity, beyond the physical mixture incident to the process, but it is thought that a chemical combination of the oil and bean tissue occurs by reason of the nascent condition existing when the beans reach the browning state, as the flavor is distinct from that produced by first roasting beans in the ordinary way, then pulverizing and mixing them with nut oil.

It will be appreciated that the soya bean, after cooking as described, may be used in various ways and as a part or whole of food preparations prepared in accordance with familiar practices, as discretion may dictate, with or without grinding.

I claim:

The method of preparing a bean of the character described, consisting in soaking it in water until expanded by absorption, then immediately thereafter introducing it into a boiling oil whereby to permanently fix the bean in its enlarged size and cooking it therein to brittleness.

In testimony whereof I affix my signature.

ROLAND P. BAILE.